United States Patent
Irifune

(10) Patent No.: US 6,875,795 B2
(45) Date of Patent: Apr. 5, 2005

(54) ULTRAVIOLET-CURABLE SILICONE COMPOSITION

(75) Inventor: Shinji Irifune, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 94 days.

(21) Appl. No.: 10/461,431

(22) Filed: Jun. 16, 2003

(65) Prior Publication Data

US 2003/0232900 A1 Dec. 18, 2003

(30) Foreign Application Priority Data

Jun. 14, 2002 (JP) .......................................... 2002-174210

(51) Int. Cl.$^7$ .......................... C09J 183/06; C08G 77/14
(52) U.S. Cl. ........................... 522/31; 522/148; 528/33; 428/48.1; 428/447
(58) Field of Search ............................. 522/31, 148; 528/33, 528/37, 40; 428/447, 40.1, 48.1; 427/517

(56) References Cited

U.S. PATENT DOCUMENTS

| | | | | |
|---|---|---|---|---|
| 4,370,358 A | * | 1/1983 | Hayes et al. ................. | 427/515 |
| 4,994,299 A | * | 2/1991 | Stein et al. .................. | 427/515 |
| 5,198,476 A | * | 3/1993 | Kobayashi et al. ............ | 522/31 |
| 5,310,601 A | * | 5/1994 | Riding ........................ | 428/429 |
| 5,360,833 A | * | 11/1994 | Eckberg et al. ............... | 522/31 |
| 5,369,205 A | * | 11/1994 | Eckberg et al. ............... | 528/25 |
| 5,397,813 A | * | 3/1995 | Eckberg et al. ............... | 522/31 |

* cited by examiner

*Primary Examiner*—Susan Berman
(74) *Attorney, Agent, or Firm*—Millen White Zelano & Branigan, P.C.

(57) ABSTRACT

The invention provides a silicone composition curable by ultraviolet irradiation to give a cured film on a substrate surface exhibiting surface releasability against sticky surfaces. Advantageously, peeling works of a sticky surface from the cured surface of the inventive composition can be carried out with no or little generation of peeling noises which deteriolate the working environment. The composition comprises three different types of organopolysiloxane compounds of which the first is a so-called MQ siloxane, the second is a linear or cyclic diorganopolysiloxane having epoxy-containing substituents on the silicon atoms other than the chain terminal silicon atoms and the third is a straight or branched linear organopolysiloxane compound substituted by an epoxy-containing substituent on each of the chain terminal silicon atoms in a specified weight proportion of these three. The composition contains an onium salt compound as a photoreaction initiator to promote the ultraviolet-induced curing.

7 Claims, No Drawings

ULTRAVIOLET-CURABLE SILICONE COMPOSITION

BACKGROUND OF THE INVENTION

The present invention relates to an ultraviolet-curable silicone composition. More particularly, the invention relates to an organopolysiloxane-based composition curable by irradiation with ultraviolet light and capable of giving a cured film having surface releasability against adhesive or sticky surfaces to find usefulness as a back-surface treatment agent for pressure-sensitive adhesive tapes and coating agent on a releasable protective sheet for pressure-sensitive adhesive labels and adhesive fixing fastener tapes for, e.g., disposable diapers.

As is well known, ultraviolet-curable silicone compositions are old and many proposals were made heretofore for various types of such compositions. Among them, in particular, it is only in recent years that a large number of proposals are made for an ultraviolet-curable silicone composition comprising an organopolysiloxane having epoxy groups in the molecular structure and an onium salt compound which acts, when the composition is irradiated with ultraviolet light, as a photoreaction-initiator to effect curing of the composition (see, for example, Japanese Patent Publication 02-38602 and Japanese Patent Kokai 3-128975). As compared with an ultraviolet-curable silicone composition by utilizing the mechanism of a radical reaction for ultraviolet-induced curing of the silicone composition, the curing reaction in the ultraviolet-curable silicone composition of the above-mentioned type is little susceptible to the inhibition by oxygen in the air so that the silicone compositions can be cured satisfactorily by irradiation with ultraviolet light even in the atmospheric air. Accordingly, the ultraviolet-curable silicone compositions based on an epoxysilicone and an onium salt compound are expected to be widely employed in the above-mentioned applications.

As a trend in recent years, taping and labeling works with pressure-sensitive adhesive tapes or labels are conducted mostly by utilizing a machine which works sometimes at a great velocity necessarily resulting in an increased peeling resistance on the releasable sheet eventually accompanied by a trouble of vibrations of the tapes or labels usually with generation of so-called peeling noises by which deterioration of the working environment due to noisiness is unavoidable.

Since generation of a peeling noise is a result of fluctuating variations in the peeling resistance of the releasable sheet, a large fluctuation in the peeling resistance not only causes a large peeling noise but also greatly disturbs normal running conditions of the taping or labeling machine which is designed and constructed under a presupposition of a constant peeling resistance.

Plastic film-based pressure-sensitive adhesive tapes are sometimes used as a fastener tape for fixing a disposable paper diaper around the waist of the wearer. While it is necessary that, in order to ensure stability of the diaper around the waist, the peeling resistance of the fastener tapes is considerably high, a large peeling force of the fastener tape necessarily leads to generation of an unpleasant peeling noise when the fastener tape is peeled off in removal or re-fitting of the diaper. Since diapers are used as a daily commodity, generation of a large peeling noise from the fastener tapes is naturally undesirable and should be avoided without undue decrease in the peeling resistance of the fastener tapes to ensure fitting stability of the diapers.

SUMMARY OF THE INVENTION

The present invention accordingly has an object to provide a novel and improved ultraviolet-curable silicon composition capable of readily giving, by irradiation with ultraviolet light, a cured film having surface releasability from the surface of a sticky substance with a relatively high peeling resistance and without generation of a peeling noise.

Thus, the present invention provides an ultraviolet-curable silicone composition which comprises, as a uniform blend:

(A) a first organopolysiloxane compound represented by the general unit formula

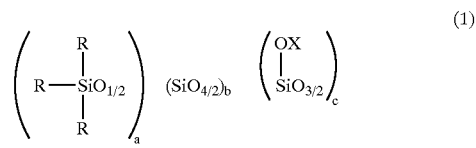

in which the subscripts a, b and c are each a positive number with the proviso that a:(b+c) is in the range from 0.5 to 2, R is, each independently from the others, a monovalent hydrocarbon group having 1 to 10 carbon atoms and X is a hydrogen atom or a monovalent group represented by the general formula

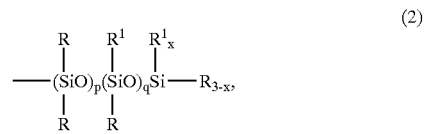

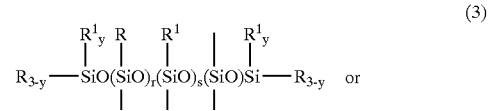

in which R has the same meaning as defined for R in the general unit formula (1) representing the component (A) above, $R^1$ is, each independently from the others, an epoxy group-containing monovalent hydrocarbon group and the subscripts p, q, r, s and t are each 0 or a positive integer, u is a positive integer, x and y are each 0, 1, 2 or 3 with the proviso that q+x and s+y are each a positive integer, p+q is in the range from 1 to 40, r+s is in the range from 1 to 40 and t+u is in the range from 2 to 7;

(B) a second organopolysiloxane compound represented by the general formula

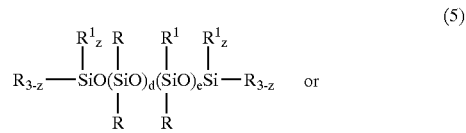

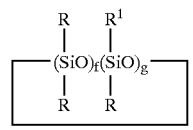

in which R and R¹ each have the same meaning as defined above and the subscripts d, e, f and g are each a positive number with the proviso that d+e is in the range from 3 to 45 and f+g is in the range from 3 to 8;
(C) a third organopolysiloxane compound represented by the general formula

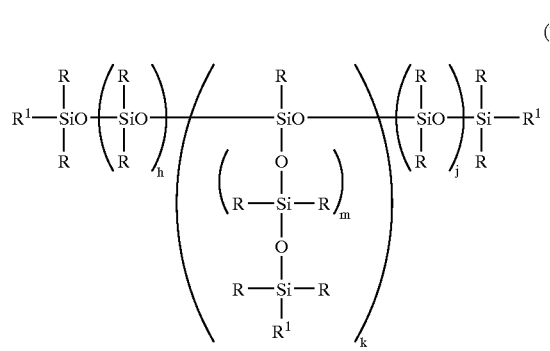

in which R and R¹ each have the sane meaning as defined above and the subscripts h, j and m are each 0 or a positive integer and k is 0, 1, 2 or 3 with the proviso that the number given by the formula h+k(m+2)+j+2 is in the range from 50 to 300, the relative amounts of the components (A), (B) and (C) by weight satisfying the relationships that the ratio (A):(B) is in the range from 0.1 to 1.5 and the ratio of [(A)+(B)]:(C) is in the range from 1.0 to 9.0; and
(D) a catalytic amount of an onium salt compound.

In the above given definition of the respective components, the monovalent hydrocarbon group denoted by R can optionally be substituted for a part or all of the hydrogen atoms therein with substituent groups free from an epoxy-containing group or atoms including hydroxyl groups, amino groups, cyano groups and halogen atoms.

DETAILED DESCRIPTION OF THE PREFERRED EMBODIMENTS

Thus, the above-summarized present invention provides a novel ultraviolet-curable silicone composition comprising three different types of organopolysiloxane compounds, i.e. components (A), (B) and (C), with admixture of a catalytic onium salt compound, i.e. component (D), as a result of the inventor's extensive investigations to establish a unique formulation of an ultraviolet-curable silicone composition capable of being readily cured by irradiation with ultraviolet light to give a surface film having surface releasability from which no large peeling noise is generated in peeling from a sticky surface even under a relatively great peeling resistance.

Namely, the first organopolysiloxane compound as the component (A) is represented by the general unit formula (1) given above, in which R is, each independently from the others, a monovalent hydrocarbon group having 1 to 10 carbon atoms exemplified by alkyl groups such as methyl, ethyl, propyl and butyl groups, cycloalkyl groups such as cyclohexyl group and aryl groups such as phenyl and tolyl groups, of which alkyl and aryl groups are preferred in respect of good peeling behavior of the cured surface film of the composition. These monovalent hydrocarbon groups can optionally be substituted for a part or all of the hydrogen atoms therein with substituent groups other than epoxy group-containing substituent groups such as hydroxyl, cyano and amino groups as well as halogen atoms to give, for example, 3-hydroxypropyl, 2-cyamoethyl, 1-chloropropyl and 3,3,3-trifluoropropyl groups.

The X in the general unit formula (1) is a hydrogen atom to form a silanolic hydroxyl group —OH or an organosiloxysilyl group represented by the general formula

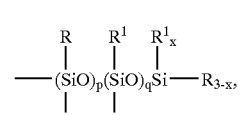

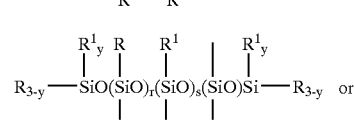

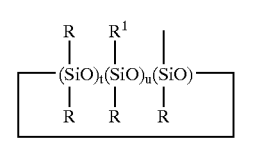

in which R has the same meaning as defined for the general unit formula (1), and R¹ is an epoxy group-containing monovalent group exemplified by 2-(2,3-epoxycyclohexyl) ethyl, 2-(2-methyl-2,3-epoxycyclohexyl)propyl, 5,6-epoxyhexyl, 2-(3,4-epoxycyclohexyl)ethyl and 4-(3,4-epoxybutyloxy)butyl groups. When X is a hydrogen atom to give a silanolic hydroxyl group —OH, the content of the silanolic hydroxyl groups in the component (A) preferably does not exceed 5% by weight.

The subscripts a, b and c in the general unit formula (1) are each a positive number to satisfy the relationship of the ratio a:(b+c) to be in the range from 0.5 to 2 or, preferably, from 0.6 to 1.3. When this ratio is too small, the composition may have an excessively high viscosity to cause inconvenience in the coating application of the composition to a substrate surface while, when the ratio is too large, the cured surface film of the composition cannot exhibit an adequately high peeling resistance. The subscripts p, q, r, s and t in the general formulas (2), (3) and (4) are each 0 or a positive integer, q+y, s+y and u are each a positive integer and x and y are each 0, 1, 2 or 3 with the proviso that p+q is in the range from 1 to 40, r+s is in the range from 1 to 40 and t+u is in the range from 2 to 7.

The second organopolysiloxane compound as the component (B) is an epoxy group-containing organopolysiloxane compound and represented by the general formula

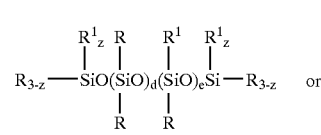

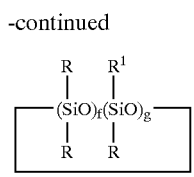

in which R and R¹ each have the same meaning as defined before, the subscripts d, e, f and g are each 0 or a positive integer and z is 0, 1, 2 or 3 with the proviso that z+e and g are each a positive integer, f+g is an integer of 3 to 8 and d+e is an integer of 3 or larger. It is preferable that the organopolysiloxane compound as the component (B) has a viscosity at 25° C. not exceeding 50000 centipoise or, more preferably, not exceeding 10000 centipoise. This requirement corresponds to a limitation that d+e preferably does not exceed 45 or more preferably does not exceed 40.

The third organopolysiloxane compound as the component (C) is a straightly linear or branched diorganopolysiloxane compound terminated at each molecular chain end with an epoxy group-containing terminal group and is represented by the general formula

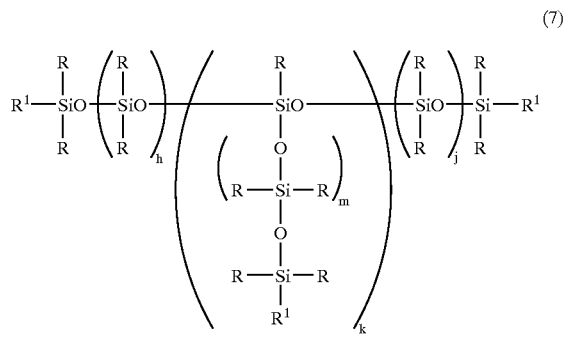

in which R and R¹, each indepemdemtly from the others, have the same meaning as defined before, the subscript k is 0 or a positive integer not exceeding 3 and the subscripts h, j and m are each a positive integer with the proviso that the number given by the formula h+k(m+2)+(j+2), i.e. the average number of silicon atoms in a molecule of the organopolysiloxane compound, is in the range from 50 to 300. When the number of silicon atoms in a molecule is too small, a cured surface film of the silicone composition is liable to generation of peeling noises in peeling off from a sticky surface while, when the number is too large, the silicone composition suffers a decrease in the ultraviolet-curability.

In formulating the silicone composition of the invention with the above descrined three different types of organopolysiloxane compounds, it is essential that the weight proportion of the components (A), (B) and (C) satisfies the relationships that the weighgt ratio of (A):(B) is in the range from 0.1 to 1.5 and the weight ratio of [(A)+(B)]:(C) is in the range from 1.0 to 9.0. When the weight ratio of (A):B) is too small, the cured surface film of the silicone composition cannot exhiit an adequately high peeling resistance while, when the ratio is too large, an undue decrease is resulted in the ultraviolet-curability of the composition. When the weight ratio of [(A)+(B)]:(C) is too small, the cured surface film of the composition would be liable to generation of peeling noises upon peeling of a sticky surface therefrom while, when this ratio is too large, the silicone composition also suffers a great decrease in the ultraviolet-curability.

The component (D) compounded in the inventive silicone composition in combination with the above described three diferent types of organopolysiloxane compounds (A), (B) and (C) is an onium salt compound which acts as a catalytic photoreaction initiator in the ultraviolet-induced crosslinking or curing reaction of the composition. The onium salt compound suitable for use as the component (D) in the present invention includes, though not particularly limitative thereto, diaryliodonium salts, triarylsulfonium salts, triarylselenonium salts, tetraarylphosphonium saalts and aryldiazonium salts represented by the general formulas $Ar_2I^+ X^-$, $Ar_3S^+X^-$, $Ar_3Se^+X^-$, $Ar_4P^+X^-$ and $ArN_2^+X^-$, respectively, in which Ar is an aryl group and $X^-$ is an anion of the formula $SbF_6^-$, $AsF_6^-$, $PF_6^-$, $BF_4^-$, $HSO_4^-$ or $ClO_4^-$. Among the above named onium salt compounds, diaryliodonium and triarylsulfonium hexafluoroantimonates are particularly preferable in respect of the good ultraviolet-curability of the composition compounded therewith.

The amount of the above described component (D) added to the inventive silicone composition is selected in the range from 0.1 to 20 parts by weight per 100 parts by weight of the total amount of the components (A), (B) and (C). When the amount of the component (D) is too small, no complete ultraviolet-curing can be accomplished in the coating films of the silicone composition while, when the amount thereof is too large, the surface condition of the ultraviolet-cured coating film of the composition is adversely influenced resulting in deteriorated peelability performance of the releasable surface film of the composition. The mechanism of the crosslinking reaction induced by ultraviolet irradiation in the presence of the component (D) is presumably that the cationic species generated from the component (D) by ultraviolet irradiation causes a ring-opening polymerization reaction of the epoxy groups in the organopolysiloxane compound constituting the composition leading to curung of the silicone composition.

It is of course optional according to need that the inventive silicone composition consisting of the above described essential components (A) to (D) is further admixed with a variety of known additives conventionally added to similar silicone compositions including, for example, stabilizers, heat-resistance improvers, fillers, pigments, levelling agents, epoxy-based diluents, vinyl ether-based diluents, adhesion improvers to a substrate surface, antistatic agents, defoaming agents, non-reactive organopolysiloxane compounds and others each in a limited amount. If necessary for improving the efficiency in the coating works therewith, the silicone composition can be diluted with a small volume of a suitable organic solvent to be imparted with a decreased viscosity. The peeling resistance on the surface of the cured silicone composition of the invention can be controlled by admixing the silicone composition with an epoxy-containing organopolysiloxane compound of a further different type.

The substrate material on which a cured coating film of the inventive silicone composition is formed by ultraviole irradiation includes, though not particularly limitative, sheets of paper materials such as glassine paper, kraft paper and clay-coated paper, paper-based laminated sheets such as polyethylene-laminated woodfree paper and polyethylene-laminated kraft paper, films of plastic resins such as polyesters, polypropylenes, polyethylenes, polyvinyl chlorides, polytetrafluoroethylenes and polyimides and foils of metals such as aluminum.

Any known coating methods in the art can be used in coating the above described substrate materials with the inventive silicone composition over the whole substrate surface or on limited areas of necessity including the methods of roller coating, gravure coating, wire-doctor coating, air-knife coating and dip coating. The thickness of the coating film of the silicone composition on the substrate surface is, though depending on the particular application intended, in the range from about 0.1 to about 10 μm so that the coating amount with the composition is controlled within a range from 0.01 to 100 g/m². A variety of ultraviolet lamps can be used as the light source in the ultraviolet-curing of the thus formed coating film of the silicone composition on the substrate surface including high-, medium- and low-pressure mercury lamps, xenon lamps, metal halide lamps and mercury arc lamps. The ultraviolet irradiation dose to accomplish adequate curing of the coating film is usually in the range from 10 to 100 mJ/cm². Such an irradiation dose can be obtained, for example, by a 0.01 to 10 seconds exposure of the coating film to the ultraviolet light coming from a high-pressure mercury lamp of 80 watts/cm output at a distance of 5 to 20 cm from the coating film.

In the following, the ultraviolet-curable silicone composition of the present invention is described in more detail by way of Examples and Comparative Examples, which, however, never limit the scope of the invention in any way, as preceded by a description of the testing procedures for evaluation of the silicone compositions. In the following, the term of "parts" always refers to "parts by weight".

[Testing of Ultraviolet-Curability]

An OPP (oriented polypropylene) film was coated with the silicone composition under testing in a coating amount of about 0.8 g/m² and the coating film of the silicone composition was exposed to the ultraviolet light coming from two high-pressure mercury lamps of each 80 watts/cm output for different exposure times to record the minimum exposure dose in mJ/cm² required to accomplish curing of the coating film of the silicone composition on the substrate surface. Curing of the coating film was taken as adequate when the surface of the coating film did not lose glossiness by gently rubbing with a finger tip.

[Testing of Peeling Resistance]

An OPP film was coated with the ultraviolet-curable silicone composition in a coating amount of about 0.8 g/m² and the coating film was exposed to the ultraviolet light coming from two high-pressure mercury lamps of each 80 watts/cm output for giving an exposure dose of 70 mJ/cm² to effect curing of the coating film. Thereafter, a pressure-sensitive adhesive kraft tape (Grade No. 712, a product by Nitto Denko Co.) was attached to the thus cured coating film followed by seasoning for 3 to 5 hours at room temperature. The thus prepared test specimen was subjected to a peeling test to separate the OPP film and the adhesive kraft tape by pulling in a 180° pulling angle on a tensile testing machine at a pulling velocity of 0.3 m/minute or 30 m/minute to record the pulling force required for peeling of the adhesive kraft tape as a measure of the peeling resistance.

[Testing of Peeling Noise]

The above described procedure of peeling test at a pulling velocity of 0.3 m/minute was carried out in a noiseless room to detect generation of a noise caused by peeling of the adhesive kraft tape.

Synthesis of Organopolysiloxane 1

A four-necked flask equipped with a stirrer, thermometer, reflux condenser and dropping funnel was charged with 450 parts of a first 60% by weight toluene solution of an OH group-containing organopolysiloxane compound consisting of $Me_3SiO_{1/2}$ units (M units), $SiO_{4/2}$ units (Q units) and $(HO)SiO_{3/2}$ units (Q units), Me being a methyl group, of which the (M units)/(Q units) molar ratio was 0.70 and the content of the OH groups was 0.85% by weight, and 345 parts of an α,ω-dihydrogen dimethylpolysiloxane expressed by the average formula of $H-SiMe_2-O-(SiMe_2O)_8-SiMe_2-H$.

The above prepared organopolysiloxane mixture was, with admixture of 1.2 parts of a 0.5% by weight toluene solution of a complex compound of platinum as a catalyst, heated for 3 hours at 132° C. under reflux so as to effect the dehydrogenation condensation reaction between the two organopolysiloxane.

Separately, another four-necked flask equipped with a stirrer, thermometer, reflux condenser and dropping funnel was charged with 142 parts of 4-vinylcyclohexene oxide and 0.65 part of a 0.5% by weight toluene solution of the platinum catalyst to form a mixture which was heated and kept at 70° C. and to which whole volume of the above-mentioned reaction mixture after the dehydrogenation condensation reaction was added dropwise taking 2 hours through the dropping funnel followed by agitation of the mixture for additional 1 hour at 70° C. The thus obtained reaction mixture was stripped of toluene and other volatile materials at 80° C. under a pressure of 3 Torr to give 680 parts of a clear and brownish liquid organopolysiloxane product, which is referred to as the Sample 1 hereinbelow, having a viscosity of 350 cP at 25° C. and an epoxy equivalent of 800 g/mole.

The results of the NMR and GPC analyses of this Sample 1 led to a conclusion that it was a mixture of a Q units-containing organopolysiloxane (A) and the epoxy group-containing organopolysiloxane (B) in a weight proportion (A):(B) of about 0.7.

Synthesis of Organopolysiloxane 2

The procedure was substantially the same as in Synthesis 1 described above except that the first 60% by weight toluene solution of the organopolysiloxane was replaced with the same amount of a second 60% by weight toluene solution of another organopolysiloxane consisting of the $Me_3SiO_{1/2}$ units (M units), $SiO_{4/2}$ units (Q units) and $(HO)SiO_{3/2}$ units (Q units), of which the molar proportion of the M units to the Q units M/Q was 0.65 and the content of the OH groups was 1.45% by weight, to give 670 parts of a clear and brownish liquid product, which is referred to as the Sample 2 hereinbelow, having a viscosity of 400 cP at 25° C. and an epoxy equivalent of 820 g/mole.

The results of the NMR and GPC analyses of this Sample 2 led to a conclusion that it was a mixture of a Q units-containing organopolysiloxane (A) and the epoxy group-containing organopolysiloxane (B) in a weight proportion (A):(B) of about 0.7.

EXAMPLE 1

An ultraviolet-curable silicone composition was prepared by admixing 1 part of an iodonium salt compound as a photoreaction initiator (CAT-7603, a product by Shin-Etsu Chemical Co., a 90% by weight solution of bis(4-alkylphenyl)iodonium hexafluoroantimonate) with an organopolysiloxane blend prepared in advance by thoroughly mixing 70 parts of the Sample 1 prepared above and 30 parts of an epoxy-terminated dimethylpolysiloxane, referred to as the Siloxane 1 hereinbelow, expressed by an average formula of $E-SiMe_2O-(-SiMe_2O-)_{98}-SiMe_2-E$, in which Me is a methyl group and E is a 2-(2,3-epoxycyclohexyl)ethyl group.

The thus prepared ultraviolet-curable silicone composition was subjected to the evaluation tests according to the testing procedures described before to give the results shown in Table 1 below.

EXAMPLE 2

The experimental procedure was substantially the same as in Example 1 excepting for the replacement of the Sample 1 in Example 1 with the same amount of the Sample 2. The results of the evaluation tests are shown in Table 1.

EXAMPLE 3

The experimental procedure was substantially the same as in Example 1 excepting for an increase of the amount of the Sample 1 from 70 parts to 90 parts and a decrease of the amount of the Siloxane 1 from 30 parts to 10 parts. The results of the evaluation tests are shown in Table 1.

EXAMPLE 4

The experimental procedure was substantially the same as in Example 1 excepting for the replacement of the Siloxane 1 with the same amount of a second epoxy-terminated dimethylpolysiloxane, referred to as the Siloxane 2 hereinbelow, expressed by an average formula of E—SiMe$_2$O—(—SiMe$_2$O—)$_{48}$—SiMe$_2$—E, in which Me and E each have the same meaning as defined in Example 1. The results of the evaluation tests are shown in Table 1.

EXAMPLE 5

The experimental procedure was substantially the same as in Example 1 excepting for the replacement of the Siloxane 1 with the same amount of a third epoxy-terminated dimethylpolysiloxane expressed by an average formula of E—SiMe$_2$O—(—SiMe$_2$O—)$_{208}$—SiMe$_2$—E, in which Me and E each have the same meaning as defined in Example 1. The results of the evaluation tests are shown in Table 1.

COMPARATIVE EXAMPLE 1

The experimental procedure was substantially the same as in Example 1 excepting for omission of the Siloxane 1 and, instead, an increase of the amount of the Sample 1 from 70 parts to 100 parts. The results of the evaluation tests are shown in Table 1.

COMPARATIVE EXAMPLE 2

The experimental procedure was substantially the same as in Comparative Example 1 excepting for replacement of the Sample 1 with the same amount of the Sample 2. The results of the evaluation tests are shown in Table 1.

COMPARATIVE EXAMPLE 3

The experimental procedure was substantially the same as in Example 1 excepting for an increase of the amount of the Sample 1 from 70 parts to 95 parts and a decrease of the amount of the Siloxane 1 from 30 parts to 5 parts. The results of the evaluation tests are shown in Table 1.

COMPARATIVE EXAMPLE 4

The experimental procedure was substantially the same as in Example 1 excepting for a decrease of the amount of the Sample 1 from 70 to 40 parts and an increase of the amount of the Siloxane 1 from 30 parts to 60 parts. The results of the evaluation tests are shown in Table 1.

TABLE 1

| | | UV dose for curing, mJ/cm$^2$ | Peeling resistance, g/2.5 cm | | Peeling noise |
| --- | --- | --- | --- | --- | --- |
| | | | at 0.3 m/minute | at 30 m/minute | |
| Example | 1 | 70 | 560 | 820 | no |
| | 2 | 70 | 620 | 900 | no |
| | 3 | 60 | 790 | 930 | little |
| | 4 | 70 | 763 | 810 | little |
| | 5 | 80 | 600 | 1160 | no |
| Comparative Example | 1 | 50 | 870 | 920 | yes |
| | 2 | 50 | 950 | 1000 | yes |
| | 3 | 60 | 840 | 940 | yes |
| | 4 | 140< | — | — | — |

What is claimed is:

1. A silicone composition curable by irradiation with ultraviolet light which comprises, as a uniform blend:

(A) a first organopolysiloxane compound represented by the unit formula

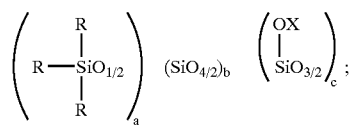

in which the subscripts a, b and c are each a positive number satisfying the relationship that the ratio of a:(b+c) is in the range from 0.5 to 2.0, R is a monovalent hydrocarbon group having 1 to 10 carbon atoms or a monovalent hydrocarbon group substituted for a part or all of the hydrogen atoms by substituent groups selected from hydroxyl groups, cyano groups, amino groups and halogen atoms, X is a hydrogen atom or a monovalent group represented by the formula

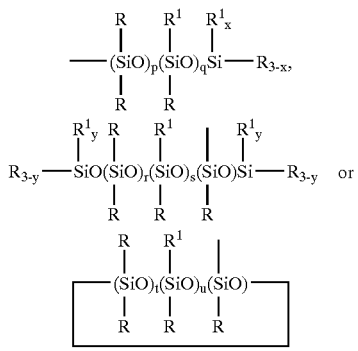

the subscripts p, q, r, s and t each being 0 or a positive integer, the subscript u being a positive integer, the subscripts x and y being each 0, 1, 2 or 3, with the proviso that the sums of the subscripts q+x and s+y are each a positive integer, p+q is in the range from 1 to 40, r+s is in the range from 1 to 40 and t+u is in the range from 2 to 7, and R$^1$ being a monovalent group having an epoxy group;

(B) a second organopolysiloxane compound represented by the formula

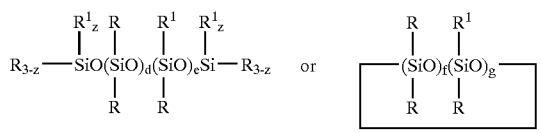

in which R and R$^1$ each have the same meaning as defined above, the subscript z is 0, 1, 2 or 3 and the subscripts d, e, f and g are each 0 or a positive integer with the proviso that d+e is in the range from 3 to 45 and f+g is in the range from 3 to 8;

(C) a third organopolysiloxane compound represented by the formula

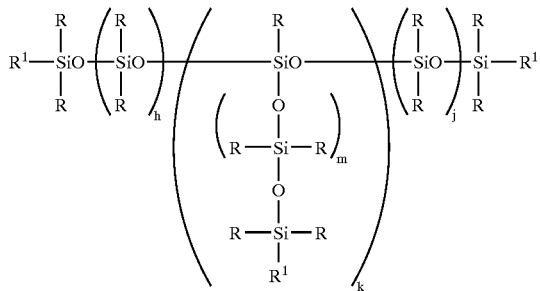

in which R and R$^1$ each have the same meaning as defined above, the subscript k is an integer of 0, 1, 2 or 3 and the subscripts h, j and m are each a positive number with the proviso that the number given by the formula h+k(m+2)+j+2 is in the range from 50 to 300; and (D) a catalytic amount of an onium salt compound as a photoreaction initiator, the relative amounts of the components (A), (B) and (C) satisfying the relationship that the weight ratio of (A):(B) is in the range from 0.1 to 1.5 and the weight ratio of [(A)+(B)]:(C) is in the range from 1.0 to 9.0.

2. The silicone composition as claimed in claim 1 in which the monovalent hydrocarbon group denoted by R is an alkyl group or an aryl group.

3. The silicone composition as claimed in claim 1 in which the component (D) is a triarylsulfonium hexafluoroantimonate.

4. The silicone composition as claimed in claim 1 in which the component (D) is a diaryliodonium hexafluoroantimonate.

5. The silicone composition as claimed in claim 1 in which the amount of the component (D) is in the range from 0.1 to 20 parts by weight per 100 parts by weight of the total amount of the components (A), (B) and (C).

6. The silicone composition as claimed in claim 1 in which the second organopolysiloxane compound as the component (B) has a viscosity not exceeding 50000 centipoise at 25° C.

7. The silicone composition as claimed in claim 1 in which the subscripts h, g, j and m in the general formula representing the third organopolysiloxane compound as the component (C) satisfy the relationship that the number given by the formula h+k(m+2)+j+2 is in the range from 80 to 200.

* * * * *